United States Patent [19]

DiOrio

[11] Patent Number: 4,572,506
[45] Date of Patent: Feb. 25, 1986

[54] RASTER LINE COMPARATOR CIRCUIT FOR VIDEO GAME

[75] Inventor: David W. DiOrio, Easton, Pa.

[73] Assignee: Commodore Business Machines, West Chester, Pa.

[21] Appl. No.: 500,981

[22] Filed: Jun. 3, 1983

[51] Int. Cl.[4] ............................................. A63F 9/22
[52] U.S. Cl. ........................... 273/1 E; 273/DIG. 28;
340/146.2; 340/723; 358/22; 364/521
[58] Field of Search ............... 307/355, 356, 328, 358;
340/146.2, 723-726, 729; 358/22, 107; 364/200
MS File, 900 MS File; 273/1 E, DIG. 28;
434/307, 323; 324/73 R

[56] References Cited

U.S. PATENT DOCUMENTS

| | | | |
|---|---|---|---|
| 3,916,306 | 10/1975 | Patti | 324/73 R |
| 3,993,917 | 11/1976 | Kalter | 307/356 |
| 4,031,511 | 6/1977 | Britton | 340/146.2 |
| 4,170,741 | 10/1979 | Williams | 307/355 |
| 4,286,320 | 8/1981 | Ott | 364/200 |
| 4,323,982 | 4/1982 | Eichrodt et al. | 340/146.2 |
| 4,333,025 | 6/1982 | Domogalla | 307/355 |
| 4,393,394 | 7/1983 | McCoy | 358/22 |
| 4,441,171 | 4/1984 | Hoffmann | 307/355 |

OTHER PUBLICATIONS

Guttag et al., "Video Display Processor Simulates Three Dimensions", Electronics, Nov. 20, 1980, pp. 123-126.

Primary Examiner—Richard C. Pinkham
Assistant Examiner—MaryAnn Stoll Lastova
Attorney, Agent, or Firm—John J. Simkanich

[57] ABSTRACT

A comparator circuit incorporated into a video game device and operated responsive to first and second non-overlapping clock pulses can be used to compare background information location to SPRITE information location for both raster line (vertical) and column (horizontal) coordinates to provide a high speed interrupt signal to a central processor unit (CPU) triggering a processing of SPRITE or other features' display instead of a processing of background display, the comparator being implemented in less silicon area and having a lower power usage than other types of circuit implementations.

9 Claims, 2 Drawing Figures

RASTER LINE COMPARATOR CIRCUIT FOR VIDEO GAME

BACKGROUND OF THE INVENTION

This invention relates to monitoring circuits for a games and specifically to raster line comparators which compare display location to stored location instructions.

Video games are played using circuits which supply video and audio signal information to the antenna leads of a color television type display. Video information comprises background data; and fixed object data and movable object (called a "SPRITE" data. The fixed object data becomes a part of the background data for any specific game. SPRITE location and movable features location (and therefore data instructions) change from instant to instant as the game is played.

Additional predetermined trajectory or vector information can also be displayed according to the game played. This additional vector information can include moving "bullets", "missiles", swing vines, moving balls of all varieties and anything else the game inventor can think of.

It is important to display all of the game information accurately. One approach is to display the background in raster line fashion with background data instructions being provided for all 525 scan lines on the display screen. An object to be displayed, appears in front of the background and therefore is displayed instead of background information at that particular screen location.

A high speed comparator circuit is needed to switch the game circuitry from background to object data.

Video games find a marketplace either as a consumer item, or an arcade item. They need to use as little power as possible and be capable of being made as inexpensively as possible, i.e. be implemented with as little circuitry as possible.

An object of this invention is to provide a high speed raster location and column location comparator circuit.

A second object of this invention is to provide such a circuit which minimizes D.C. power use.

A further object of this invention is to provide such a circuit which can be implemented in LSI and NMOS circuitry in a minimal amount of silicon area.

SUMMARY OF THE INVENTION

The objects of this invention are realized in a digital circuit which when implemented in duplicate monitors raster scan line location and column scan location in the video display driver circuit of a video game device or computer. The circuit is implemented in large scale integrated circuitry (LSI) utilizing NMOS technology. A raster line address (or vertical address) instruction for any object to be displayed is loaded into a register and compared with the video display driver instantaneous raster line (or vertical) location. The stored addresses are recirculated into the device to assure current data.

Any stored raster line (or vertical) address, for any instantaneous object data instruction, is loaded responsive to a first clock pulse.

A second, non-overlapping clock pulse is utilized to initiate a comparison operation with the instantaneous raster line (or vertical) information to initiate an interrupt signal which is used by another circuit to change the display for that line (or vertical).

Power drain is minimized. Silicon area need for implementation is minimized.

DESCRIPTION OF THE DRAWINGS

The features, operation and advantages of the invention can be learned from a reading of the following detailed description of the invention with the accompanying drawings in which like numerals refer to like elements, and in which.

DETAILED DESCRIPTION OF THE INVENTION

Video game devices provide a color display to a player comprised of a background, usually non-moving, of SPRITES, i.e. movable objects, usually player responsive; and of other features, either fixed or moving, usually player non-responsive.

Such video game devices are commonly implemented by circuits connected to home computers which then become dedicated to a game program entered into memory, or commonly implemented by special purpose circuits, i.e. video games which provide input signals to the antenna leads of a color television (or black and white), or implemented as a stand-alone video arcade-type machine. Regardless of the type of implementation, game information signal processing can produce the same video display.

When implemented as a special purpose "video game" of the type popular in the consumer marketplace, the circuit implementation is desirable to be of low cost and low power consumption design. These design goals are impressed on the present invention.

Background to be displayed is loaded into the consumer video game device from a program and usually comprises a background data instruction set (data) and object, i.e. SPRITE instruction set (data).

The device provides an output signal which is translated into line-by-line (or column-by-column) display signals received by the television display device. The device operates to generate a background display only and unless this format is interrupted to display SPRITE or other features information.

SPRITE and other features data is loaded into the video game device from the program, and as with the background data is dependent upon the "game being played". The display addresses for SPRITES and other features, however, can be varied by the central processor unit (CPU) of the video game device and by player controlled inputs. Instantaneous SPRITE and other feature addresses are held in memory.

Information processing within the video game device can utilize two non-overlapping clock pulses which are provided to the circuit environment. LSI implementation, especially in NMOS technology provide the possibility for a low power and inexpensive circuit design.

To completely determine SPRITE position a horizontal "compare" is accomplished using the comparison device of the invention. The circuit compares the horizontal position (x-direction) with the stored SPRITE vector. It is this comparison function which necessitates high speed performance since it must compare locations at the dot frequency of a typical color TV set display, i.e. about 8 MH$_z$. A vertical position (y-direction) "compare" is accomplished with the comparison device of the invention at an approximate 63 microsecond repetition rate. Boot strap circuit conditioning principles assure fast operation and low power drain.

Figure 1:
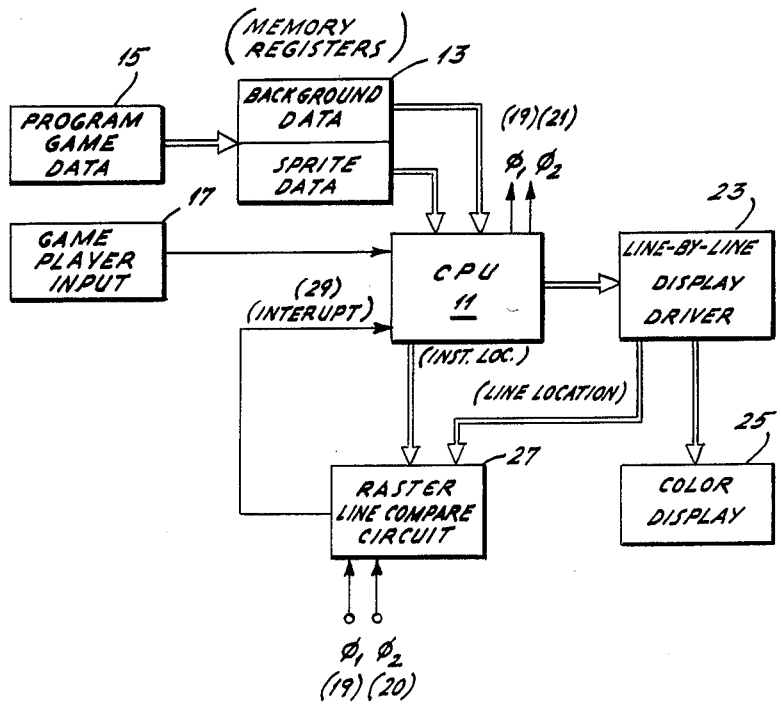
FIG. 1 is a block diagram of the digital video game device and the digital comparator circuit invention (as illustrated for raster line compare)

FIG. 1 shows the video game device environment in which the present invention operates and the intra-circuit connection with the circuit comprising the present invention. Shown is only the raster line (y-direction) location determination circuitry. A central processing unit (CPU) 11 receives background data information and SPRITE data information (as well as other feature information) from memory registers 13. These memory registers 13 are loaded from a game program 15. The game program provides data in the form of digital signals stored on a magnetic tape or other storage mediums.

The CPU 11 also receives game information from a game player input device 17. CPU 11 generates two non-overlapping clock pulses ($\phi$1) 19 and ($\phi$2) 21 for its own use and for use by other circuit components. An output of the CPU 11 is connected to a line-by-line display driver 23. This display driver 23 provides signals to a color display (or black and white) 25. Most typically in consumer home applications this color display is implemented by the television set.

A raster line comparator circuit 27 receives instantaneous line location information from the line-by-line display driver 23 and raster line address instruction locations for object display (SPRITES or other features) from the CPU 11. The non-overlapping clock pulses 19, 21 are each fed into the raster line comparator circuits 27. The raster line comparator circuit provides an interrupt signal output 29 which is sent back to the CPU 11.

Figure 2:
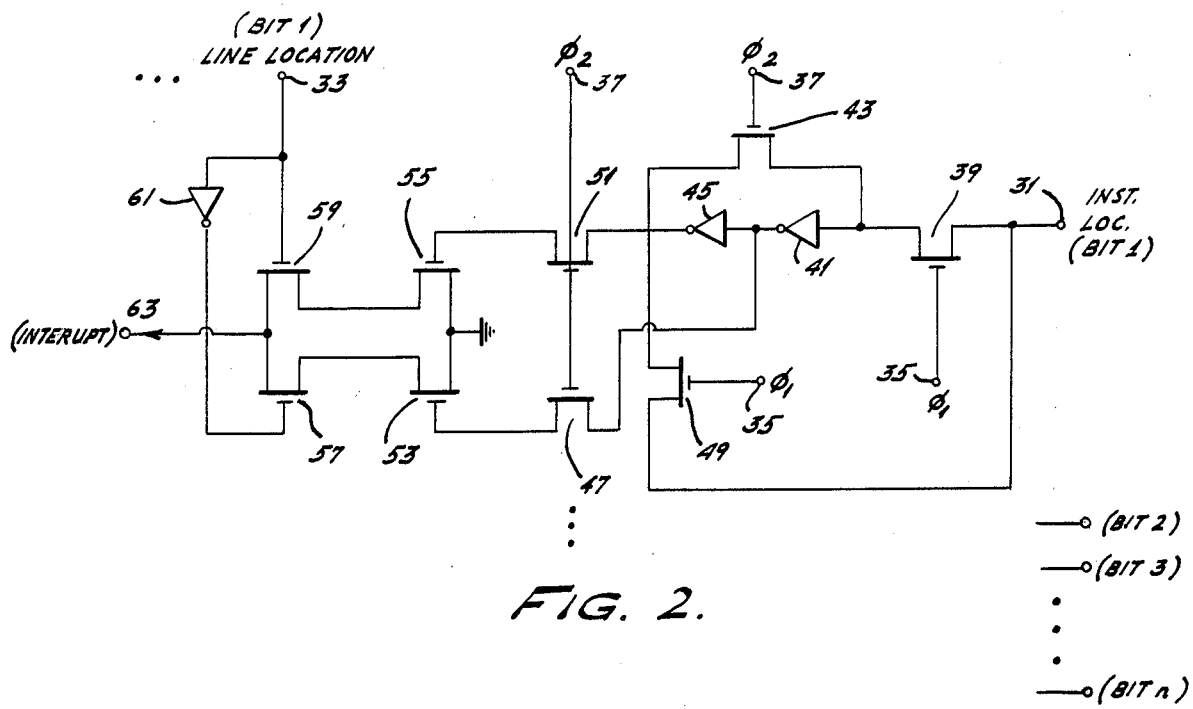
FIG. 2 is a circuit diagram of the comparator circuit invention as represented for processing a single digital bit of information or plural bit instructions (whether raster line or vertical information).

The raster line comparator circuit 27 of FIG. 1 can be implemented as shown in FIG. 2 to process a single bit "word" or a plural bit "word". Most often with commercially available CPU's 11 the circuit, FIG. 2, is required to process 8 bit words. As the circuit implementation is duplicated for each bit, only one bit processing is shown in full in FIG. 2.

Instruction location information received from the CPU 11 is input to the circuit at node 31. Instantaneous line location information received from the line-by-line display driver 23 is input to the circuit at node 33. The first clock pulse ($\phi$1) 19 is input to the circuit at node 35, while the second non-overlapping clock pulse ($\phi$2) 21 is input to the circuit at node 37.

The first clock pulses 19 are utilized to load information into a register, which is a part of the circuit of FIG. 2 and to recirculate the information through the register so that information is not lost and/or information is updated. The second clock pulse 21 is then used to clock the operation of the comparison function while the comparison portion of the circuit 27 is isolated from the CPU 11, thereby minimizing D.C. power drain (power usage). The first clock pulse 19 is utilized to precondition the circuit enabling faster operational speeds.

Circuit node 31 is connected to the drain pin of a first field effect transistor (FET) 39, while FET 39 has its gate pin connected to the node 35.

The source pin of FET 39 is connected to a first operational amplifier 41 and to the drain pin of a second FET 43. This second FET 43 has its gate pin connected to the circuit node 37.

The output from the first operational amplifier 41 is connected to a second operational amplifier 45 and to the drain pin of a third FET 47. The output from the second operational amplifier 45 is connected to the source pin of the second FET 43, the drain pin of a fourth FET 49 and the drain pin of a fifth FET 51.

The fourth FET 49 has its source pin connected to the circuit node 31 and its gate pin connected to the circuit node 35.

The gate pins of each of the third and fifth FETs 47, 51 are connected to the circuit node 37. The source pin of the third FET 47 is connected to the gate pin of a sixth FET 53, while the source pin of the fifth FET 51 is connected to the gate pin of a seventh FET 55. These sixth and seventh FETs 53, 55 have their drain pins connected together and to circuit ground.

The source pin of the sixth FET 53 is connected to the drain pin of an eighth FET 57, while the source pin of the seventh FET 55 is connected to the drain pin of a ninth FET 59. The gate pin of the eighth FET 57 is connected to the circuit node 33 through an amplifier 61, while the gate pin of the ninth FET 59 is directly connected to this circuit node 33. The source pins of the eighth and ninth FETs 57, 59 are connected together and to circuit node 63 which provides the interrupt signal 29 connection to the CPU 11.

The amplifiers 41, 45, and 61 are each of the inverting type. Amplifier 41 serves as the storage register while amplifier 45 provides an inverted or complementary output signal to that of the first amplifier 41. The third and fifth FETs 47, 51 provide a switch function which isolates the register amplifiers 41, 45 from the comparison portion of the circuit.

FETs 53, 55, 57, 59 are connected to form a cross coupled NAND gate circuit which performs the actual comparison function. The circuit is designed to simultaneously compare both the signals and their inverse as a check on a logical zero versus the absence of a signal. Amplifier 61 on its output provides the inverse of the line location information appearing on circuit node 33.

For (x-direction) column (vertical line) location comparison, the line-by-line display driver 23, FIG. 1, (vertical display driver for horizontal line location) is replaced by a horizontal display driver. The circuit of FIG. 2 remains identical.

The implementation as disclosed above may be modified or changed without departing from the intent or scope of the invention. It is therefore intended that this disclosure be interpreted in the illustrative sense and not read in the limiting sense.

What is claimed is:

1. A circuit incorporated into a video game device which generates a color display on a raster line basis comprising:
   a processor unit, said processor unit providing first and second non-overlapping clock pulses;
   a display driver connected to receive signals from said processor unit;
   a color display connected to receive signals from said display driver;
   a stored program of data for both background display and SPRITE display;
   a plurality of memory registers connected to hold said background display data and SPRITE display data, on a vertical address raster line, said memory registers being connected to said processor unit and holding in one register background data and in another register SPRITE data;

comparator circuit means for comparing instantaneous raster line information from a connection to said display driver and raster line location instruction for SPRITE display from a connection to said processor unit, said comparator means providing an interrupt signal to said processor to instruct said processor from processing background display data to processing SPRITE display data, said comparator circuit means also being connected to said processor first and second non-overlapping clock pulses;

wherein said comparator means includes:

a first isolation switch gatable for passing a said line location instruction from said processor on said first clock pulse;

a first register to store said line location instruction and the inverse thereof, said line location instruction being connected to said first isolation switch;

second and third isolation switches gatable on said second clock pulse, and connected to selectively pass said line location instruction and the inverse of said line location instruction, respectively, from said first register; and a comparator device connected to said second and third isolation switches, said comparator device being connected to receive instantaneous line information from said display driver, the output of said comparator being connected to said processor.

2. The circuit of claim 1 wherein said comparator device is a cross-coupled NAND gate, with a first input connected to the output of said second isolation switch, a second input connected to the output of said third isolation switch, a third input connected to said display driver; also including a first inverter connected to said third input; said crosscoupled NAND gate having a fourth input connected to said first inverter output and an output connected to said processor.

3. The circuit of claim 2 wherein said first register includes a second inverter connected to the output of said first isolation switch; a third inverter connected to the output of said second inverter, the output of said third inverter being connected to the input of said second isolation switch and the output of said third isolation switch; a fourth isolation switch connected on its input to the input of said first isolation switch; a fifth isolation switch connected between the output of said fourth isolation switch on its input and the input of said second inverter on its output.

4. The circuit of claim 3 wherein said fourth switch is gated by a connection to said first pulses and said fifth switch is gated by a connection to said second pulses.

5. The circuit of claim 4 wherein said first, second, third, fourth and fifth switches are respectively, first, second, third, fourth and fifth field effect transistors.

6. The circuit of claim 5 wherein said cross-coupled NAND gate includes a sixth field effect transistor having its gate pin connected to the output of said second field effect transistor, a seventh field effect transistor having its gate pin connected to the output of said third field effect transistor, an eighth field effect transistor connected on its drain pin to the source pin of said sixth field effect transistor and its gate pin to said display driver, a ninth field effect transistor connected on its drain pin to the source pin of said seventh field effect transistor and on its gate pin to the output of said first inverter, the drain pins of said sixth and seventh field effect transistors being connected to ground, and the source pins of said eighth and ninth field transistors being connected together and to said processor as said circuit output.

7. In a video game device for generating a color display having background and object information, a circuit for monitoring the instantaneous line location (vertical and horizontal) for signaling object display, comprising:

a processor unit which generates first and second clock pulses, said first and second clock pulses, being non-overlapping, said processor unit also providing instantaneous raster location instructions;

a line-by-line display driver connected to receive signals from said processor unit and to provide raster line display information;

a color display connected to receive signals from said line-by-line display driver;

a comparator circuit connected to receive line location instructions from said processor unit and said instantaneous line display information from said line-by-line display driver, said comparator circuit operating in response to said first and second clock pulses to provide an interrupt signal to said processor unit;

a player input to said processor unit, and an object data holding register connected to said processor unit and a background data holding register connected to said processor;

wherein said comparator circuit includes:

a comparison device connected on an input to said line display information from said line-by-line display driver, and on its output to said processor;

a first switch connected on is input to the instantaneous line location instructions from said processor, said first switch being gated to conduction responsive to said first clock pulses;

a register connected to said first switch output; and a second switch connected between said register output and another input of said comparison device, said second switch being gated to conduction responsive to said second clock pulses; and wherein said comparator circuit also includes:

means for recirculating the input on said register to said input of said first switch, said recirculating means being connected across said first switch.

8. The circuit of claim 7 wherein said recirculating means includes a third switch connected to the output of said second switch and a fourth switch connected to the output of said third switch on its input and on its output to the input of said first switch, said third switch being gated to conduction responsive to said second clock pulses, said fourth switch being gated to conduction responsive to said first clock pulses.

9. The circuit of claim 8 wherein said register also generates a line instruction inverse value, wherein said second switch gates both said register value and said inverse value, wherein said comparison device generates an inverse value of said line display information from said line-by-line display driver, and wherein said comparison device compares said values and said inverse values to provide its output.

* * * * *

UNITED STATES PATENT AND TRADEMARK OFFICE
CERTIFICATE OF CORRECTION

PATENT NO. : 4,572,506

DATED : Feb. 25, 1986

INVENTOR(S) : David W. DiOrio

It is certified that error appears in the above-identified patent and that said Letters Patent is hereby corrected as shown below:

Col 1 line 7:  before "games" insert - - video - - and change "games" to - - game - -;

Col 1 line 14:  after "data" and before the "period" insert - -) - -.

Signed and Sealed this

First Day of July 1986

[SEAL]

Attest:

DONALD J. QUIGG

Attesting Officer

Commissioner of Patents and Trademarks